United States Patent
Barnea et al.

(10) Patent No.: US 10,841,231 B2
(45) Date of Patent: Nov. 17, 2020

(54) TRANSMISSION TIMEOUT SYSTEM

(71) Applicant: MELLANOX TECHNOLOGIES, LTD., Yokneam (IL)

(72) Inventors: Aviv Barnea, Yokneam Illit (IL); Ido Shamay, Netanya (IL); Eitan Zahavi, Zichron Yaakov (IL); Yossef Itigin, Hod HaSharon (IL); Rotem Damsker, Yuval (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 77 days.

(21) Appl. No.: 16/191,536

(22) Filed: Nov. 15, 2018

(65) Prior Publication Data

US 2020/0162394 A1    May 21, 2020

(51) Int. Cl.
*H04L 12/841* (2013.01)
*H04L 12/801* (2013.01)
(Continued)

(52) U.S. Cl.
CPC .......... *H04L 47/283* (2013.01); *H04L 47/193* (2013.01); *H04L 47/323* (2013.01); *H04L 47/56* (2013.01)

(58) Field of Classification Search
None
See application file for complete search history.

(56) References Cited

U.S. PATENT DOCUMENTS

| | | | |
|---|---|---|---|
| 6,523,123 B1 * | 2/2003 | Barbee | G06F 1/3228 713/300 |
| 2005/0190720 A1 * | 9/2005 | Miyake | H04L 47/14 370/328 |

(Continued)

FOREIGN PATENT DOCUMENTS

| | | |
|---|---|---|
| WO | 2014066359 A1 | 5/2014 |
| WO | 2014092786 A1 | 6/2014 |

OTHER PUBLICATIONS

Lets code a TCP/IP stack, 5: TCP Retransmission', pp. 1-7, Jul. 10, 2018 (downloaded from http://www.saminiir.com/lets-code-tcp-ip-stack-5-tcp-retransmission/).

(Continued)

*Primary Examiner* — Mohammad S Adhami
(74) *Attorney, Agent, or Firm* — Kligler & Associates Patent Attorneys Ltd (57) ABSTRACT

A method including providing a hardware-implemented networking system having a sending device, the sending device being configured to communicate with a receiving device via a communications medium, and performing the following at the sending device: providing an initial value for transmission timeout and setting a current value for transmission timeout to the initial value, sending one or more packets associated with a given queue from the sending device to the receiving device via the communications medium, setting a packet transmission timeout timer associated with the given queue to the current value for transmission timeout; and upon expiration of a packet transmission timeout timer associated with the given queue, performing the following: A. determining whether one or more packets have been successfully received by the receiving device, and performing one or both of the following steps B and C: B. if one or more packets have been successfully received by the receiving device, decreasing the current value for transmission timeout, and C. if no packets have been successfully received by the receiving device, increasing the current value for transmission timeout. Related apparatus and methods are also provided.

19 Claims, 7 Drawing Sheets

(51) Int. Cl.
    *H04L 12/823* (2013.01)
    *H04L 12/875* (2013.01)

(56) References Cited

U.S. PATENT DOCUMENTS

| | | | |
|---|---|---|---|
| 2006/0230119 A1 | 10/2006 | Hausauer et al. | |
| 2013/0019025 A1* | 1/2013 | Chaturvedi | H04L 29/06517 709/231 |
| 2019/0007928 A1* | 1/2019 | Di Girolamo | H04L 67/12 |

OTHER PUBLICATIONS

Wikipedia—"RDMA over Converged Ethernet", pp. 1-5, Oct. 23, 2018.
Braden., "Requirements for Internet Hosts—Communication Layers", Request for Comments: 1122, pp. 1-116, Oct. 1989.
Paxson et al., "Computing TCP's Retransmission Timer", Request for Comments: 6298, pp. 1-11, Jun. 2011.
Wikipedia—'TCP congestion control', pp. 1-12, Nov. 13, 2018.
European Application # 19208717.9 search report dated Apr. 15, 2020.

* cited by examiner

TRANSMISSION TIMEOUT SYSTEM

FIELD OF THE INVENTION

The present invention relates to networking systems, and particularly but not exclusively to transmission timeout issues in networking systems.

BACKGROUND OF THE INVENTION

Networking systems which use timeout to inform a sender of possible non-receipt of a transmission, such that the sender can retransmit the (apparently) not received transmission, are known in the art. The TCP protocol, in TCP/IP, is one example of a system using timeout; TCP is described in RFC 1122, while a mechanism for calculating a value deemed appropriate for a retransmission timer used in TCP is described in RFC 6298. Conceptually, determining a value for the retransmission timer TCP is intended to maximize bandwidth and minimize latency, in so far as possible. As described in RFC 6298, the TCP retransmission timer is based on round trip time (RTT).

SUMMARY OF THE INVENTION

The present invention, in certain embodiments thereof, seeks to provide an improved networking system, and particularly but not exclusively an improved network system using transmission timeout.

In some networking systems in general, maximizing bandwidth (given available transmission media) and at the same minimizing latency may be a desired outcome.

There is thus provided in accordance with an exemplary embodiment of the present invention a method including providing a hardware-implemented networking system having a sending device, the sending device being configured to communicate with a receiving device via a communications medium, and performing the following at the sending device: providing an initial value for transmission timeout and setting a current value for transmission timeout to the initial value, sending one or more packets associated with a given queue from the sending device to the receiving device via the communications medium, setting a packet transmission timeout timer associated with the given queue to the current value for transmission timeout; and upon expiration of a packet transmission timeout timer associated with the given queue, performing the following: A. determining whether one or more packets have been successfully received by the receiving device, and performing one or both of the following steps B and C: B. if one or more packets have been successfully received by the receiving device, decreasing the current value for transmission timeout, and C. if no packets have been successfully received by the receiving device, increasing the current value for transmission timeout.

Further in accordance with an exemplary embodiment of the present invention the method includes performing both steps B and C.

Still further in accordance with an exemplary embodiment of the present invention step A also includes resending at least one previously-sent packet from the sending device to the receiving device via the communications medium.

Additionally in accordance with an exemplary embodiment of the present invention the method also includes maintaining a state indication indicating a state for the current value for transmission timeout, the state indication including an indication of whether the current value for transmission timeout has been increasing or decreasing, and the increasing the current value for transmission timeout includes based, at least in part, on the state indication, conditionally increasing the current value for transmission timeout, and the decreasing the current value for transmission timeout includes based, at least in part, on the state indication, conditionally decreasing the current value for transmission timeout.

Moreover in accordance with an exemplary embodiment of the present invention the method also includes maintaining a packet transmission timer counter of a number of times that a packet transmission timer has expired, and step A also includes based, at least in part, on a value of the packet transmission timer counter, conditionally resending at least one previously-sent packet from the sending device to the receiving device via the communications medium.

Further in accordance with an exemplary embodiment of the present invention the method also includes iteratively performing the sending, setting, and upon expiration steps.

Still further in accordance with an exemplary embodiment of the present invention the increasing the current value for transmission timeout includes increasing the current value for transmission timeout by a factor of 2.

Additionally in accordance with an exemplary embodiment of the present invention the decreasing the current value for transmission timeout includes decreasing the current value for transmission timeout by a factor of 2.

Moreover in accordance with an exemplary embodiment of the present invention the method also includes providing a minimum value and a maximum value for transmission timeout, and the current value for transmission timeout has a range from the minimum value for transmission timeout to the maximum value for transmission timeout.

There is also provided in accordance with another exemplary embodiment of the present invention apparatus including a network interface configured to transmit data packets over a communications medium to a receiving device, the network interface including network interface circuitry, which is configured to process data packets over the communications medium, and a transmission timeout computation unit configured to determine and modify a transmission timeout value, the transmission timeout computation unit being further configured to determine an initial value for transmission timeout and set a current value for transmission timeout to the initial value, the network interface being configured to send one or more packets, each of the one or more packets being associated with a given queue, to the receiving device via the communications medium, and also being configured to set a packet transmission timeout timer associated with the given queue to the current value for transmission timeout, and, upon expiration of a packet transmission timeout timer associated with the given queue, to perform the following: A. based, at least in part, on a value of the given packet identifier, determine whether one or more packets have been successfully received by the receiving device, and to perform one or both of the following steps B and C: B. if one or more packets have been successfully received by the receiving device, the transition timeout computation unit decreases the current value for transmission timeout, and C. if no packets have been successfully received by the receiving device, the transition timeout computation unit increases the current value for transmission timeout.

Further in accordance with an exemplary embodiment of the present invention the network interface circuitry includes the transmission timeout computation unit.

Still further in accordance with an exemplary embodiment of the present invention the network interface is configured to perform both step B and step C.

Additionally in accordance with an exemplary embodiment of the present invention the network interface is also configured to perform the following as part of performing A: resend at least one previously-sent packet from the sending device to the receiving device via the communications medium.

Moreover in accordance with an exemplary embodiment of the present invention the transmission timeout computation unit is also configured to maintain a state indication indicating a state for the current value for transmission timeout, the state indication including an indication of whether the current value for transmission timeout has been increasing or decreasing, and the network interface is also configured, based on the state indication, to conditionally increase the current value for transmission timeout, and the network interface is also configured, based on the state indication, to conditionally decrease the current value for transmission timeout.

Further in accordance with an exemplary embodiment of the present invention the network interface is also configured to maintain a packet transmission timer counter of a number of times that a packet transmission timer has expired, and the network interface is also configured to perform the following as part of performing A: based, at least in part, on a value of the packet transmission timer counter, conditionally resend at least one previously-sent packet from the sending device to the receiving device via the communications medium.

Still further in accordance with an exemplary embodiment of the present invention the apparatus is configured to iteratively send one or more packets, set the packet transmission timeout timer, and perform A and one or both of B and C upon the expiration.

Additionally in accordance with an exemplary embodiment of the present invention, when the current value for transmission timeout is increased, the current value for transmission timeout is increased by a factor of 2.

Moreover in accordance with an exemplary embodiment of the present invention, when the current value for transmission timeout is decreased, the current value for transmission timeout is decreased by a factor of 2.

Further in accordance with an exemplary embodiment of the present invention the current value for transmission timeout has a range from a minimum value for transmission timeout to a maximum value for transmission timeout.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

The following gives an overview of exemplary embodiments of the present invention.

RoCE (RDMA over converged Ethernet) is one particular non-limiting example of a networking system in which maximizing bandwidth while minimizing latency may be a desired outcome. The present invention, in exemplary embodiments, may apply, for example: to RoCE, which provides remote direct memory access (RDMA) over Ethernet; or to InfiniBand™ RDMA.

Generally speaking, when packets are transmitted by a transmitting device in an RoCE networking system, possible lost packets are detected, as described more fully below, using timers and Out-Of-Sequence NACK packets. Retransmission in a given stream of packets is generally handled using "go back N" packets methods. By way of non-limiting example, if a NACK packet is received from a receiving device, the NACK packet indicating that packet M was not received, and the last packet transmitted by the transmitting device was packet M+N, then retransmission generally occurs starting with packet M and moving forward; this is "going back N packets".

Timeout mechanisms in RoCE, which may be used in addition to the NACK packet mechanism described above, involve using a timer for a given stream; if the timer times out and no ACK packet has been received from the receiving device, the transmitting device "assumes that" (proceeds on a basis that) reception at the receiving device has not occurred. RoCE specifies that possible timeout values are 4 $\mu s*2^M$, where M is an integer variable ranging from 0 to 31; the value of M is generally defined in software. In practice, it is typical for such a timeout to be around 1 second, although there can be significant variation in the actual value used for timeout, typically application-dependent variation.

The named inventors of the present patent application believe that using a timeout around 1 second may be appropriate in a context where the underlying transmission technology comprises lossless Ethernet (described, for example, in www.ieee802.org/1/pages/dcbridges.html) or InfiniBand™ (which is lossless by definition), where packet loss may occur at a rate of $10^{-15}$ (about 1 in $10^{15}$ packets is lost), since packet loss is very rare. Such a timeout is also useful for discovering the complete loss of a connection. However, in a context where packet loss occurs more often, such a long timeout may be inappropriate and non-optimal, at least since many additional packets may be sent before timeout occurs. As explained above, maximizing bandwidth (given available transmission media) and at the same minimizing latency may be a desired outcome. To achieve such a goal, it may be appropriate to find a good, near optimal, or optimal value for timeout. Known methods that are used in TCP, such as the method described in RFC 6298, may not be appropriate for use in RoCE, since, in general, RTT is not a known value in RoCE. This is because, in general, there is no ACK for RDMA-read-responses. RTT is also not mandated by the IB/RoCE specification, in contrast to TCP. Hence, in RoCE, RTT is not commonly used to optimize the value of timeout timers.

It will be appreciated that, in general, another difference between lossy and lossless networks is the impact of congestion. While in lossy networks, untamed (uncontrolled) congestion, generally due a to high number of bursty flows, may lead to packet drops, in lossless networks untamed congestion leads to congestion spreading backwards to the flows sources. While lossy network will experience higher packet drop rates, lossless networks may develop huge traffic jams which leads to the need for a very long timeout—in the order of few seconds.

Figure 1:
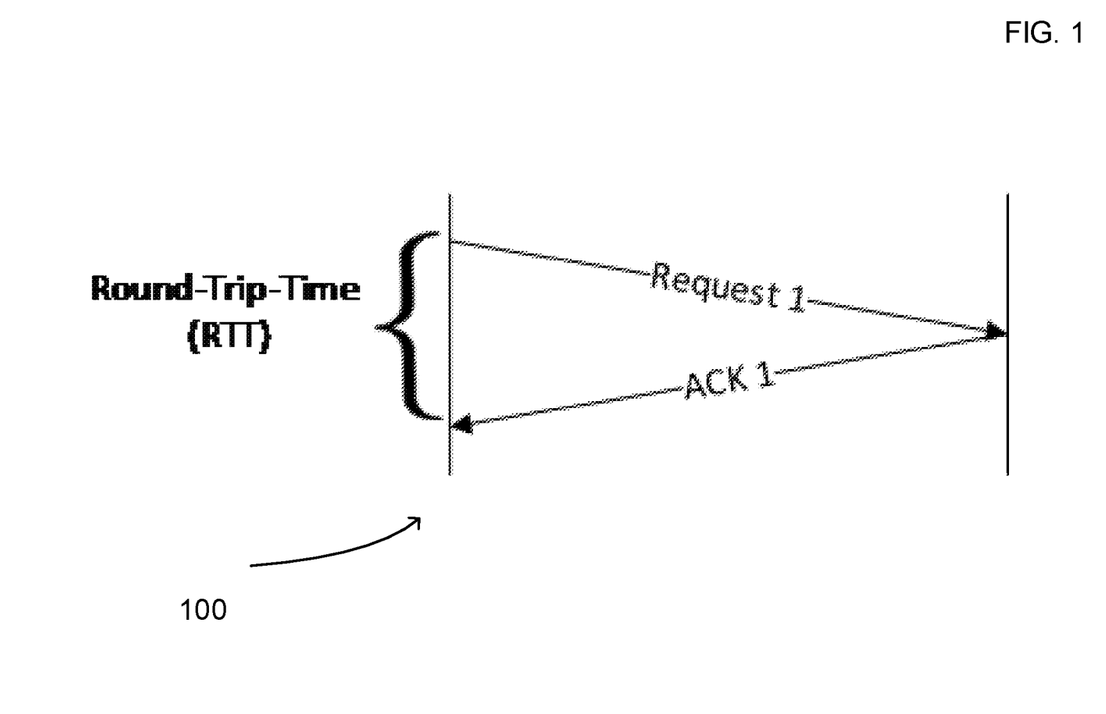
FIG. 1 is a simplified pictorial illustration depicting round trip time (RTT) in a networking system.

Turning now to a more detailed discussion of exemplary embodiments of the present invention, reference is now made to FIG. 1, which is a simplified pictorial illustration depicting round trip time (RTT) in a networking system. A networking system, generally indicated as 100, is shown in FIG. 1. In FIG. 1, by way of example, the sending of a request ("Request 1") from a sending device to a receiving device (neither shown in FIG. 1), and the sending-back of an acknowledgement ("ACK 1") are depicted. At the sending device, the time between when "Request 1" was sent and when "ACK 1" was received determines the round trip time ("Round-Trip-Time"), RTT. As explained above, while RTT is a known value in some systems (such as, for example, TCP), in other systems (such as, for example, RoCE), RTT is not a known value, as explained above.

Figure 2:
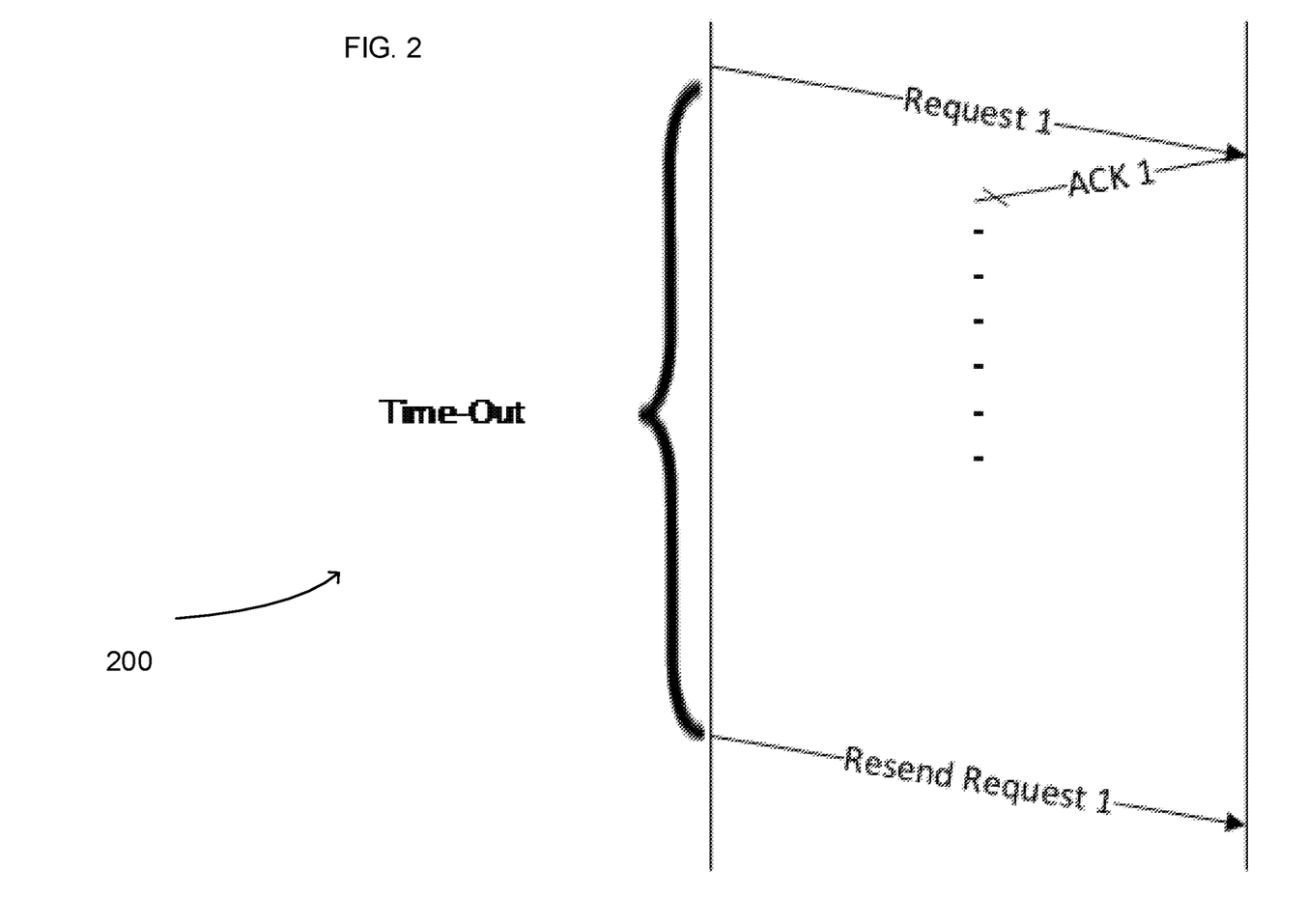
FIG. 2 is a simplified pictorial illustration depicting timeout in a networking system.

Reference is now made to FIG. 2, which is a simplified pictorial illustration depicting timeout in a networking system. A networking system, generally indicated as 200, is shown in FIG. 2. In FIG. 2, by way of example, the sending of a request ("Request 1") from a sending device to a receiving device (neither shown in FIG. 2) is depicted. No acknowledgment ("ACK 1") is received by the sending device from the receiving device. Non-receipt of the acknowledgement could be, for example, because the request was not received (and thus the request may have been lost), because of some failure at the receiving device, because of some failure of communications between the sending device and the receiving device, etc. In order to prevent a situation in which communications are "dropped", the sending device sets a timeout ("Time-Out"), also known as a timer; when the timer expires without an appropriate ACK having been received, the request with which the timer is associated is resent ("Resend Request 1").

While a relatively simple situation in which a timer is associated with a single request is depicted in FIG. 2, persons skilled the art will appreciate that more than one request can be sent in association with a single timer; if no ACKs are received for any of those more than one requests, then upon expiration of the timer, typically all such requests are resent. In certain embodiments of the present invention, as described herein, a timer is associated with a queue, and not with a single request.

Figure 3:
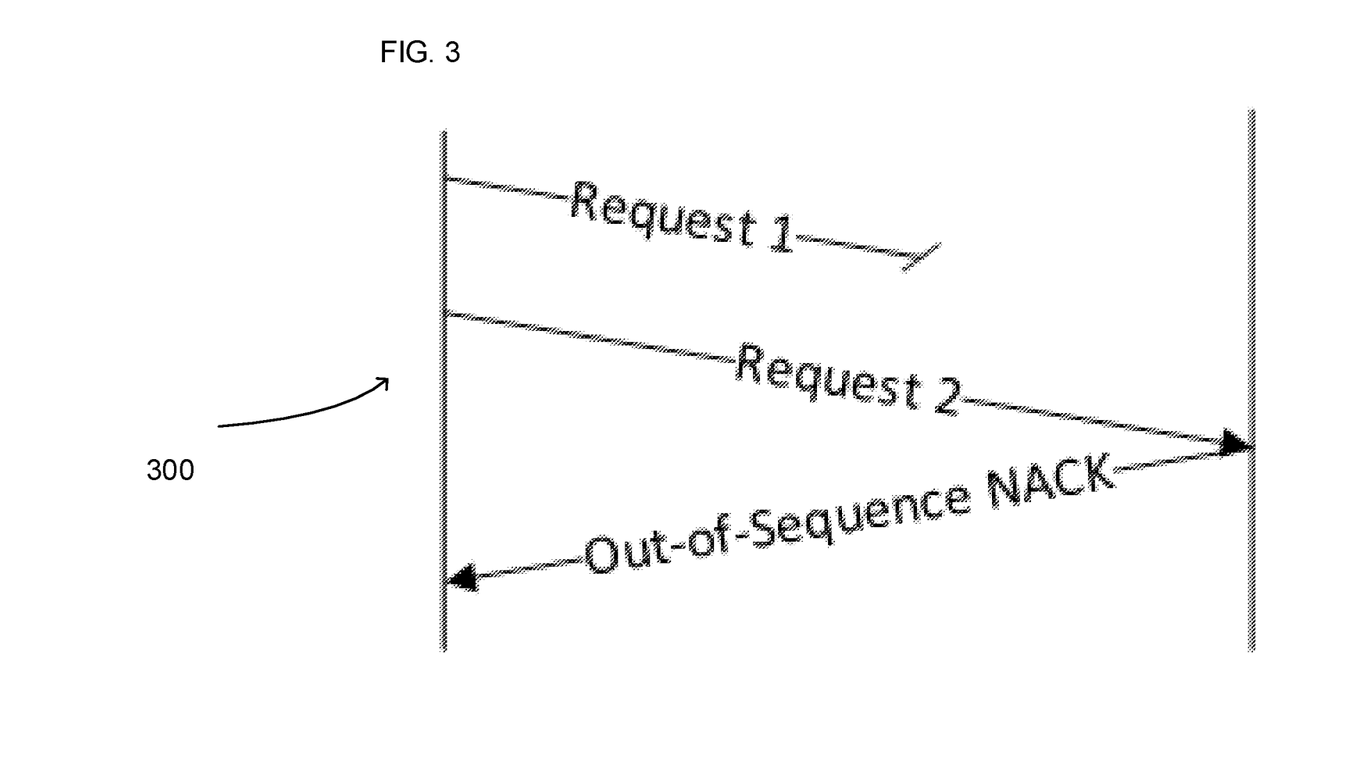
FIG. 3 is a simplified pictorial illustration depicting out of sequence NACK in a networking system.

Reference is now made to FIG. 3, which is a simplified pictorial illustration depicting out of sequence NACK in a networking system. A networking system, generally indicated as 300, is shown in FIG. 3. In FIG. 3, by way of example, the sending of a first request ("Request 1") and a second request ("Request 2") from a sending device to a receiving device (neither shown in FIG. 3) is depicted. FIG. 3 depicts, by way of non-limiting example, a case in which the first request is not received by the receiving device. At some point, the receiving device sends an indication of non-acknowledgement of the first request ("Out-of-Sequence NACK) back to the sending device; in the particular example of FIG. 3, the NACK is associated with the first request. Persons skilled in the art will appreciate that because the second request was received by the receiving device but the first request was not received by the receiving device, the receiving device can determine that a request was not received, since (as is generally known in the art) each request includes a request number or sequence number. In such a case, generally after receiving a NACK, the first request may be resent from the sending device to the receiving device, or all requests from the first request onward may be resent from the sending device to the receiving device.

Figure 4:
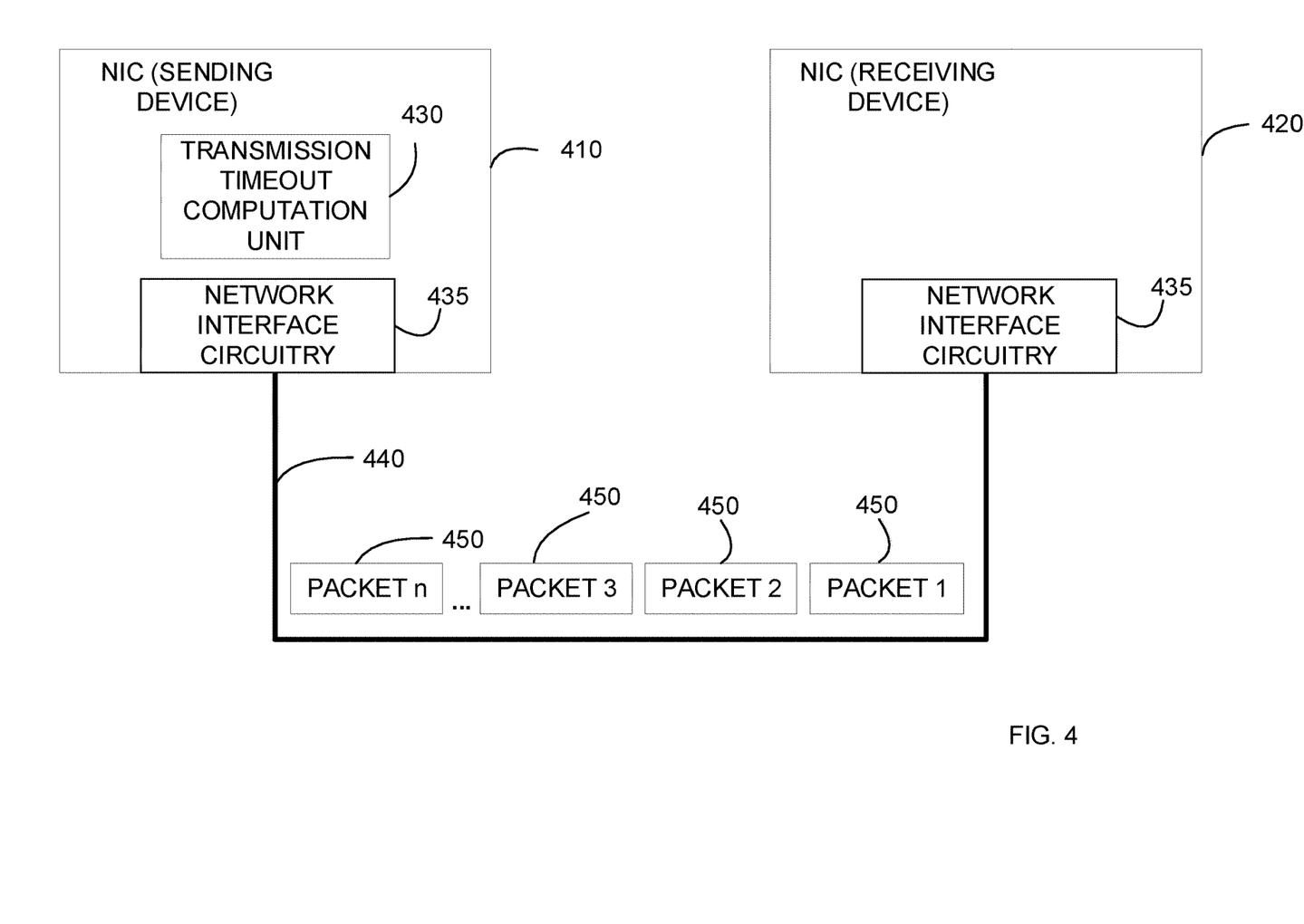
FIG. 4 is a simplified block diagram illustration of an exemplary networking system constructed and operative in accordance with an exemplary embodiment of the present invention.

Reference is now made to FIG. 4, which is a simplified block diagram illustration of an exemplary networking system constructed and operative in accordance with an exemplary embodiment of the present invention.

The system of FIG. 4 comprises a network interface controller (NIC) 410 in a sending device and a NIC 420 in a receiving device. Persons skilled in the art will appreciate that a network interface controller may also be called, for example and without limiting the generality of the embodiment of FIG. 4: a network interface; a network adapter; a physical network interface; etc.

For purposes of simplicity of depiction and description, the networking system of FIG. 4 is described in a "one way" mode in which, as described in more detail below, the NIC 410 sends packets to the NIC 420; it will be appreciated that the NIC 420 may also send packets to the NIC 410. In such a case, components described below as comprised in the NIC 410 may also be comprised in the NIC 420.

The NIC 410 and the NIC 420 are implemented in hardware, and typically but not necessarily also comprise firmware and/or software (not shown) which may be active in defining/controlling the functionality of the NIC 410 and the NIC 420.

Each of the NIC 410 and the NIC 420 comprises network interface circuitry 435 which is responsible for providing a physical and logical interface to a communications medium 440. The network interface circuitry 435, in addition to circuitry, may also include firmware and/or software.

The NIC 410 comprises a transmission timeout computation unit 430. The transmission timeout computation unit 430, the functionality of which is further described below, may be implemented in: hardware; firmware; software; or an appropriate combination of hardware and/or firmware and/or software. In some exemplary embodiments of the present invention, the transmission timeout computation unit 430 may be comprised in the network interface circuitry 435.

The NIC 410 and the NIC 420 are in operative communication via a communications medium 440. It will be appreciated that, in actual operation, the NIC 410 and the NIC 420 are generally comprised in an appropriate sending device and in an appropriate receiving device, respectively, the sending device and the receiving device not being shown in detail for clarity of depiction and description.

In the particular non-limiting example of FIG. 4, the packets 450 are sent from the NIC 410 to the NIC 420.

The communications medium 440 may comprise any appropriate communications medium, typically a networking medium configured to transfer packets from one or more senders to one or more receivers. In one particular non-limiting example, the communications medium 440 may comprise an InfiniBand™ communications medium, with the NIC 410 and the NIC 420 being configured to communicate via InfiniBand™; in a more particular non-limiting example, the communication may comprise RoCE communication, as described above. Without limiting the generality of the foregoing, the following comprise certain non-limiting examples of commercially available networking devices which, with appropriate firmware and/or software modification to implement the transmission timeout computation unit 430 and the interactions of the transmission timeout computation unit with the remainder of the NIC 410 as described herein, may be appropriate examples of the NIC 410 and the NIC 420: ConnectX-4; ConnectX-5; ConnectX-6; and BlueField™ (all commercially available from Mellanox Technologies, Ltd.).

In the particular example shown in FIG. 4, the plurality of packets 450 comprise n packets, shown by way of example in FIG. 4 as comprising packets numbered from 1 through n inclusive.

Figure 5:
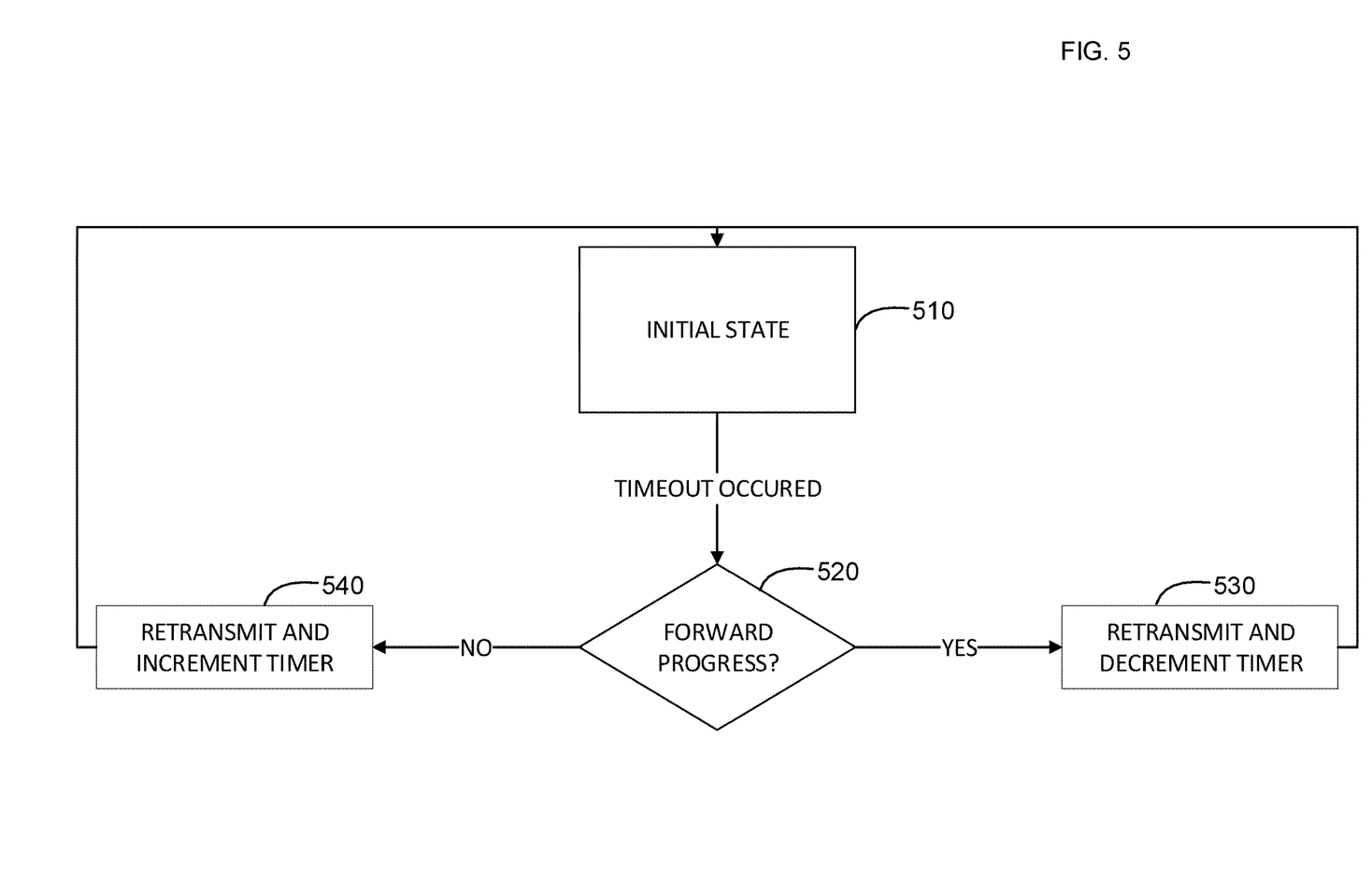
FIG. 5 is a simplified flowchart illustration depicting an exemplary method of operation of the system of FIG. 4.

Reference is now additionally made to FIG. 5, which is a simplified flowchart illustration depicting an exemplary method of operation of the system of FIG. 4. In the particular example of FIG. 5, a system (such as, by way of non-limiting example, the system of FIG. 4) begins in some initial state (step 510), in which a timeout timer has some initial value.

Persons skilled in the art will appreciate, based on the above discussion of RoCE, that in the particular non-limiting example in which the networking medium 440 facilitates RoCE communications, the initial value for the timeout timer is of the form $4\ \mu s*2^M$, where M is an integer variable ranging from 0 to 31. M could, by way of one particular non-limiting example, have an initial value of around 18, so that the initial value for the timeout timer would be around 1 second; however, significantly larger or smaller values for M may also be used, and in general M may be chosen in any given implementation based on implementation-specific considerations.

In transitioning from step 510 in FIG. 5, a timeout occurs; in step 520, a test is made (generally by the transmission timeout computation unit 430 described above; steps 530 and 540 are also generally carried out by the transmission timeout computation unit 430 described above) to determine whether there has been forward progress in transmitting the plurality of packets 450. In other words, if ACK and NACK messages received at the sending device 410 from the receiving device 420 indicate that some packets (in certain implementations, a plurality of consecutive packets such as, by way of non-limiting example, packet 2 through packet 4 inclusive) have been successfully received at the receiving device 420, then there has been forward progress; otherwise, there has not been forward progress.

By way of non-limiting example, in certain embodiments, when a successful ACK or read-response is received a bit associated with a queue of packets being sent is set to 1; the bit may be set, by way of non-limiting example, by hardware. In such embodiments, when starting or restarting transmission (after a timeout, for example) the bit is reset to 0; the bit may be reset, by way of non-limiting example, by firmware. Persons skilled in the art will appreciate that, on a subsequent timeout, checking the bit will indicate whether any successful transmission occurred since the last timeout.

If there has been forward progress per step 520, the method of FIG. 5 continues at step 530. At step 530, appropriate retransmission of non-acknowledged packets takes place, and the timeout timer is decreased ("decremented"). In the particular case of RoCE as described above, M may be decremented by 1; it is also possible for M to be decremented by a larger integer number. The method of FIG. 5 then continues by returning to step 510, with the current state being considered as the new initial state.

If there has not been forward progress per step 520, the method of FIG. 5 continues at step 540. At step 540, appropriate retransmission of non-acknowledged packets takes place, and the timeout timer is increased ("incremented"). In the particular case of RoCE as described above, M may be incremented by 1; it is also possible for M to be incremented by a larger integer number. The method of FIG. 5 then continues by returning to step 510, with the current state being considered as the new initial state.

It will be appreciated, in light of the above discussion, that the method of FIG. 5 may provide a desirable mode of operation of the system of FIG. 4, in that a timeout value which may be good, near optimal, or optimal may be achieved; this is because, when progress is made in sending packets, the timeout is made shorter, while when progress is not made, the timeout is made longer. Persons skilled in the art will appreciated that the achievement of such a good, near optimal, or optimal value takes place (unlike in TCP) without having RTT available. Such improvement/optimization of the timeout value leads in general to maximization of bandwidth and minimization of latency, thus providing a desirable mode of operation of the system of FIG. 4.

Figure 6:
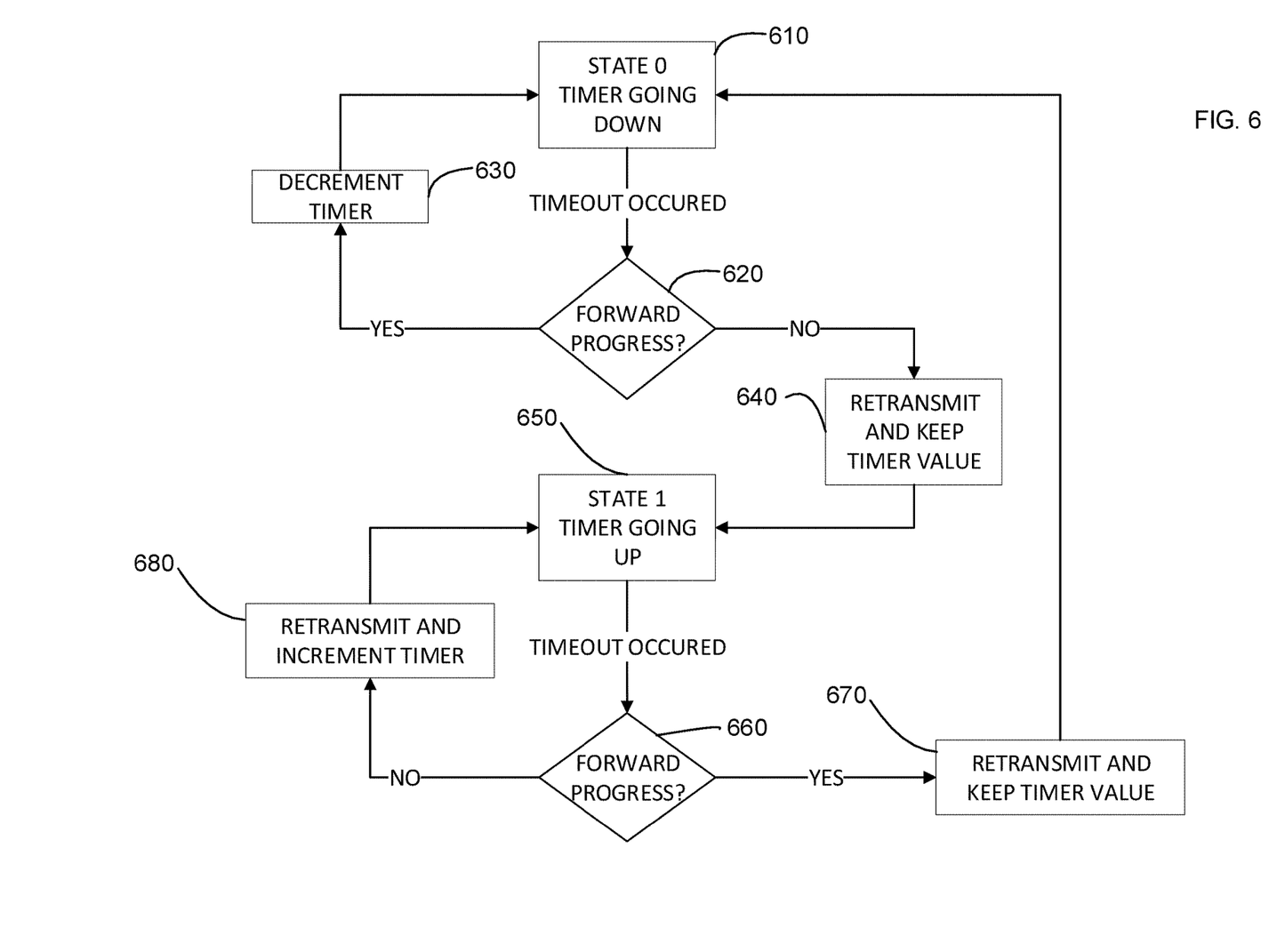
FIG. 6 is a simplified flowchart illustration depicting another exemplary method of operation of the system of FIG. 4.

Reference is now additionally made to FIG. 6, which is a simplified flowchart illustration depicting another exemplary method of operation of the system of FIG. 4.

By contrast to the above-described method depicted in FIG. 5, in the method of FIG. 6 the system of FIG. 4 may be in one of two states: a first state ("state 0") in which the timeout timer has been going down, and a second state ("state 1") in which the timeout timer has been going up. While, in the method illustrated in FIG. 6 and described below, the system begins in state 0, persons skilled in the art will appreciate that the system may alternatively begin in state 1, mutatis mutandis. In general, the steps of FIG. 6 take place in the transmission timeout computation unit 430 described above.

In step 610, the system is in state 0, with the timer going down. When a timeout occurs, the method of FIG. 6 transitions to step 620, in which a test is made to determine whether there has been forward progress in transmitting the plurality of packets 450. The operation of step 620 may be similar to that of step 520, described above.

If there has been forward progress per step 620, the method of FIG. 6 continues at step 630. The operation of step 630 may be similar to that of step 530, described above. The method of FIG. 6 then continues with step 610.

If there has not been forward progress per step 620, the method of FIG. 6 continues at step 640. In step 640, appropriate retransmission of non-acknowledged packets takes place. The timeout timer value is not changed in step 640, and the method of FIG. 6 then continues with step 650 in state 1, "timer going up".

When a timeout occurs from step 650, the method of FIG. 6 transitions to step 660, in which a test is made to determine whether there has been forward progress in transmitting the plurality of packets 450. The operation of step 660 may be similar to that of steps 520 and 620, described above.

If there has been forward progress per step 660, the method of FIG. 6 continues with step 670. The operation of step 670 may be similar to that of step 640 described above. After step 670, the method of FIG. 6 then continues with step 601.

If there has not been forward progress per step 660, the method of FIG. 6 continues with step 680. The operation of step 680 may be similar to that of step 540 described above. After step 680, the method of FIG. 6 then continues with step 650.

It will be appreciated, in light of the above discussion, that the method of FIG. 6 may provide an improvement in operation of the system of FIG. 4, in that a timeout value which may be good, near optimal, or optimal may be achieved; this is because, when progress is made in sending packets, the timeout is made shorter, while when progress is not made, the timeout is made longer. Persons skilled in the art will appreciated that the achievement of such a good, near optimal, or optimal value takes place (unlike in TCP) without having RTT available. Such improvement/optimization of the timeout value leads in general to maximization of bandwidth and minimization of latency, thus providing improved operation of the system of FIG. 4.

Compared to the method of FIG. 5, the method of FIG. 6 may achieve a good, near optimal, or optimal timeout value with less jitter, since in some circumstances it may be that the method of FIG. 5 will introduce jitter, with the timeout being made (by way of non-limiting example) shorter, longer, and then shorter again.

Figure 7:
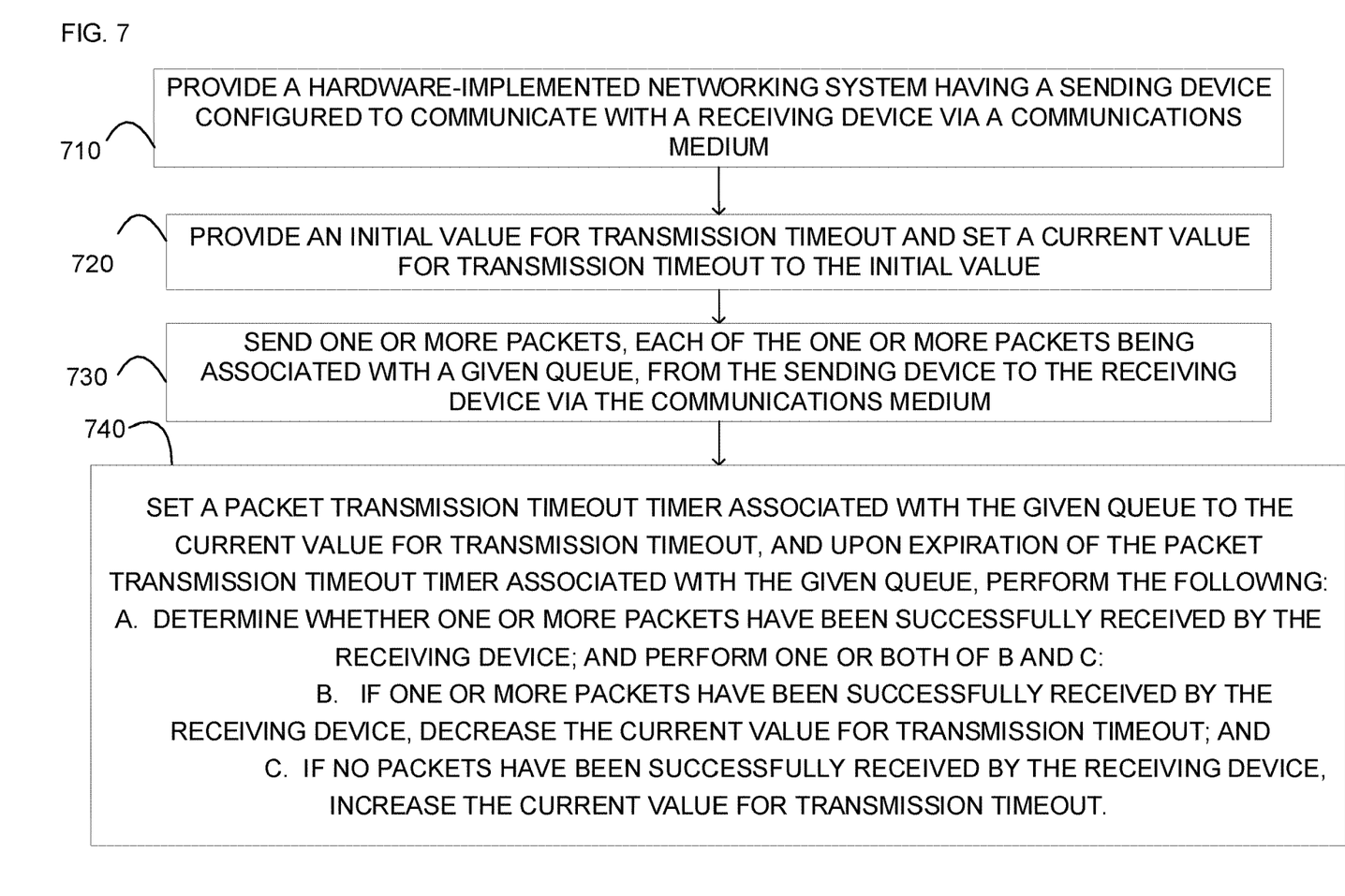
FIG. 7 is another simplified flowchart illustration depicting an exemplary method of operation of the system of FIG. 4.

Reference is now made to FIG. 7, which is another simplified flowchart illustration depicting an exemplary method of operation of the system of FIG. 4.

The method of FIG. 7, which will be largely self-explanatory in light of the above discussion, may comprise the following steps which generally are carried out by the sending device 410 (except as more particularly specified below):

In step 710, a hardware-implemented networking system having a sending device is provided. The sending device is configured to communicate with a receiving device via a communications medium; the remainder of the steps of FIG. 7 are generally carried out by the sending device.

In step 720, an initial value for transmission timeout is provided, and a current value for transmission timeout is set to the initial value.

In step 730, one or more packets associated with a given queue are sent from the sending device to the receiving device via the communications medium.

In step 740 a packet transmission timer associated with the given queue in which packets are sent is set; the transmission timer has a value of the current value for transmission timeout. Upon expiration of a transmission timer associated with a given queue:

A. A determination is made as to whether or not one or more packets have been successfully received by the receiving device; methods for making such a determination are described above. One or both of B and C are then carried out (generally by the transmission timeout computation unit 430 described above):

B. If one or more packets have been successfully received by the receiving device, the current value for transmission timeout is decreased.

C. If no packets have been successfully received by the receiving device, the current value for transmission timeout is increased.

It is appreciated that, in general, during or after step 740 non-successfully received packets are generally retransmitted.

It is further appreciated, in the methods of FIGS. 5-7, that after a certain number of changes to the value for timeout transmission have taken place, it may be that a network connection is permanently unavailable, or unavailable for an extended time. In such a case, a system administrator or user may be notified. For example, for some value N which is system dependent, such a notification might take place if total_time_without_forward_progress>N*M.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
    providing a hardware-implemented networking system having a sending device, the sending device being configured to communicate with a receiving device via a communications medium; and performing the following at the sending device:
    providing an initial value for transmission timeout and setting a current value for transmission timeout to the initial value;
    sending one or more packets associated with a given queue from the sending device to the receiving device via the communications medium;
    setting a packet transmission timeout timer associated with the given queue to the current value for transmission timeout; and
    upon expiration of a packet transmission timeout timer associated with the given queue, performing the following:
        A. determining whether one or more packets have been successfully received by the receiving device; and
        performing the following steps based on the determination:
            B. when one or more packets have been successfully received by the receiving device, decreasing the current value for transmission timeout; and
            C. when no packets have been successfully received by the receiving device, increasing the current value for transmission timeout,
    wherein at least said providing and said upon expiration of a packet transmission timer take place independently of a round trip time (RTT).

2. The method according to claim 1 and wherein step A also comprises:
    resending at least one previously-sent packet from the sending device to the receiving device via the communications medium.

3. The method according to claim 1 and also comprising:
    maintaining a state indication indicating a state for the current value for transmission timeout, the state indication comprising an indication of whether the current value for transmission timeout has been increasing or decreasing,
    and wherein said increasing the current value for transmission timeout comprises based, at least in part, on the state indication, conditionally increasing the current value for transmission timeout,
    and wherein said decreasing the current value for transmission timeout comprises based, at least in part, on the state indication, conditionally decreasing the current value for transmission timeout.

4. The method according to claim 1 and also comprising:
maintaining a packet transmission timer counter of a number of times that a packet transmission timer has expired,
and wherein step A also comprises:
based, at least in part, on a value of the packet transmission timer counter, conditionally resending at least one previously-sent packet from the sending device to the receiving device via the communications medium.

5. The method according to claim 1 and wherein the method also comprises iteratively performing the sending, setting, and upon expiration steps.

6. The method according to claim 1 and wherein said increasing the current value for transmission timeout comprises increasing the current value for transmission timeout by a factor of 2.

7. The method according to claim 1 and wherein said decreasing the current value for transmission timeout comprises decreasing the current value for transmission timeout by a factor of 2.

8. The method according to claim 1 and also comprising:
providing a minimum value and a maximum value for transmission timeout, and wherein said current value for transmission timeout has a range from said minimum value for transmission timeout to said maximum value for transmission timeout.

9. Apparatus comprising:
a network interface configured to transmit data packets over a communications medium to a receiving device, the network interface comprising:
network interface circuitry, which is configured to process data packets over the communications medium; and
a transmission timeout computation unit configured to determine and modify a transmission timeout value, the transmission timeout computation unit being further configured to determine an initial value for transmission timeout and seta current value for transmission timeout to the initial value,
the network interface being configured to send one or more packets, each of said one or more packets being associated with a given queue, to the receiving device via the communications medium, and also being configured to seta packet transmission timeout timer associated with the given queue to the current value for transmission timeout, and, upon expiration of a packet transmission timeout timer associated with the given queue, to perform the following:
A. based, at least in part, on a value of the given packet identifier, determine whether one or more packets have been successfully received by the receiving device; and
to perform the following steps based on the determination:
B. when one or more packets have been successfully received by the receiving device, the transmission timeout computation unit decreases the current value for transmission timeout; and
C. when no packets have been successfully received by the receiving device, the transmission timeout computation unit increases the current value for transmission timeout,
wherein at least the packet transmission timer is set, and said upon expiration of a packet transmission timer is performed, independently of around trip time (RTT).

10. Apparatus according to claim 9 and wherein the network interface circuitry comprises the transmission timeout computation unit.

11. Apparatus according to claim 9 and wherein the network interface is also configured to perform the following as part of performing A:
resend at least one previously-sent packet from the sending device to the receiving device via the communications medium.

12. Apparatus according to claim 9 and wherein the transmission timeout computation unit is also configured to maintain a state indication indicating a state for the current value for transmission timeout, the state indication comprising an indication of whether the current value for transmission timeout has been increasing or decreasing,
and the network interface is also configured, based on the state indication, to conditionally increase the current value for transmission timeout,
and the network interface is also configured, based on the state indication, to conditionally decrease the current value for transmission timeout.

13. Apparatus according to claim 9 and wherein the network interface is also configured to maintain a packet transmission timer counter of a number of times that a packet transmission timer has expired,
and the network interface is also configured to perform the following as part of performing A:
based, at least in part, on a value of the packet transmission timer counter, conditionally resend at least one previously-sent packet from the sending device to the receiving device via the communications medium.

14. Apparatus according to claim 9 and wherein the apparatus is configured to iteratively: send one or more packets; set said packet transmission timeout timer; and perform A and one or both of B and C upon said expiration.

15. Apparatus according to claim 9 and wherein, when said current value for transmission timeout is increased, said current value for transmission timeout is increased by a factor of 2.

16. Apparatus according to claim 9 and wherein, when said current value for transmission timeout is decreased, said current value for transmission timeout is decreased by a factor of 2.

17. Apparatus according to claim 9, and wherein said current value for transmission timeout has a range from a minimum value for transmission timeout to a maximum value for transmission timeout.

18. The method according to claim 1, and wherein said sending one or more packets comprises sending in accordance with RDMA over converged Ethernet (RoCE).

19. Apparatus according to claim 9, and wherein said network interface is configured to send said one or more packets in accordance with RDMA over converged Ethernet (RoCE).

* * * * *